United States Patent Office 3,265,641
Patented August 9, 1966

3,265,641
POLYURETHANES PREPARED FROM A MIXTURE OF A SUCROSE POLYETHER POLYOL AND AN OXYALKYLATED POLYPHENOL
Marco Wismer and Louis R. Le Bras, Gibsonia, and James F. Foote, Sarver, Pa., assignors to Pittsburgh Plate Glass Company, Pittsburgh, Pa., a corporation of Pennsylvania
No Drawing. Filed Apr. 16, 1962, Ser. No. 187,935
14 Claims. (Cl. 260—2.5)

This invention relates to polyols suitable for reacting with an organic polyisocyanate to form a polyurethane resin, and it has particular relation to polyols which can be reacted with an organic polyisocyanate and also blown to provide cellular polyurethane resins having properties superior to those of similar resins heretofore employed.

In a copending Unted States patent application Serial No. 833,143, now U.S. Patent 3,153,002, issued October 13, 1964, it is disclosed to mix sucrose, an economical and readily available raw material, with water and an alkali, and then to oxyalkylate it with a lower alkylene oxide, e.g., an alkylene oxide containing about 2 to 4 carbon atoms and being represented by ethylene oxide, propylene oxide or butylene oxide, wherein the oxygen is linked with 2 to 4 adjacent carbon atoms, thus replacing active hydrogen atoms of the sucrose hydroxyl groups with hydroxyalkyl groups.

In a further United States patent application, Serial No. 26,398, now U.S. Patent 3,085,085, issued April 9, 1963, a variation of the process of the first application is disclosed wherein the sucrose is only partially oxyalkylated with alkylene oxide in the presence of water and alkali, and the water is then stripped off and the product is then further oxyalkylated under anhydrous, or nearly anhydrous, conditions to provide a product wherein active hydrogen atoms of the hydroxyl groups of the sucrose are again replaced by hydroxy terminated alkyl groups.

In either instance, it is preferred to react each of the sucrose molecules with about 10 to about 25 molecules of the alkylene oxide. The oxyalkylation products of sucrose thus obtained may be termed "polyether polyols" and may be aproximately represented by the structure:

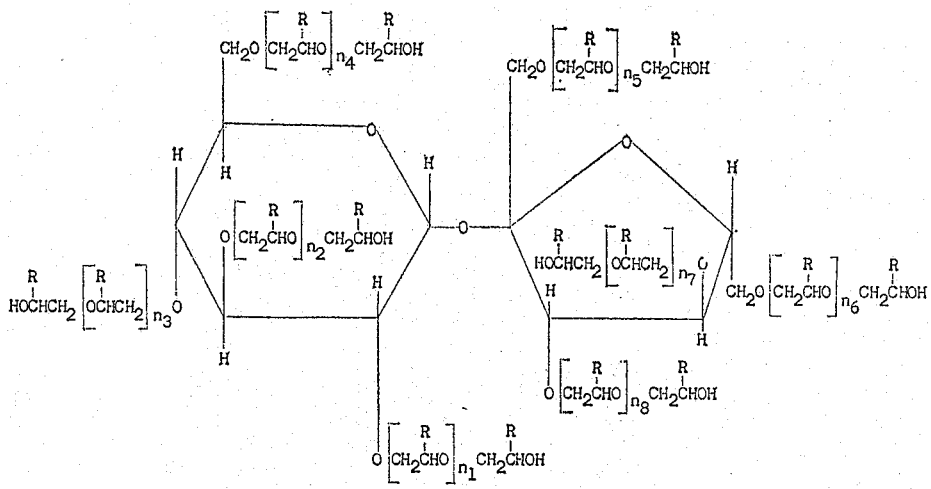

In the formula, R is selected from the class consisting of hydrogen or methyl, and $n_1, n_2, n_3, n_4, n_5, n_6, n_7$ and $n_8$ are whole numbers from 0 to 8 and their sums being in a range of about 2 to about 18, dependent upon the number of oxide molecules introduced. Products containing propylene oxide are particularly desirable.

By appropriately controlling the reaction conditions involved in preparing the sucrose polyether polyols, products having hydroxyl values in a range of about 200 to about 700 may be obtained. These polyether polyols of sucrose have a functionality, due to the hydroxyl groups, of above 6 and usually of about 8 per molecule. They readily react with organic diisocyanates to form polyurethane resins that can be foamed with a blowing agent and cured to provide highly cellulated rigid bodies of excellent properties. These cellulated bodies may be used for many purposes, such as heat insulation, sound insulation, as cases for instruments or for packing scientific instruments, and for many other purposes. They are of particular use as insulators in refrigerators, freezers and truck bodies.

While sucrose polyether polyols of hydroxyl values in the following ranges can be used in the production of polyurethane foams, it has been found that the foams from sucrose polyether polyols of hydroxyl values in the lower portion of the range, e.g., below 400, tend to transmit excessive amounts of moisture. They also tend to be dimensionally unstable if subjected to a combination of high temperatures and high humidities. When subjected to these conditions, they tend to swell and may split under the effects thereof. Since in cold insulation there is always a cold side and an ambient side of the insulator, water vapor on the ambient side will tend to migrate and condense on the cold side. Water vapor transmission and humidity resistance are therefore very important properties.

High water vapor transmission and poor humidity resistance can often be in large measure corrected by using sucrose polyether polyols of a relatively high hydroxyl value, for example, of a hydroxyl value in a range above about 450 up to about 700, in forming the polyurethane foams. Such materials of high hydroxyl number when free of, or at least of low content in polyols of high hydroxyl number and low in functionality, can be reacted with organic polyisocyanates and foamed to provide cellular polyurethane products of good heat and cold stability. They are also reasonably resistant to water or moisture and therefore resist swelling and splitting.

However, the satisfaction with isocyanate groups of all of the hydroxyl groups of these sucrose polyether polyols of high hydroxyl value requires the use of relatively large amounts of the organic polyisocyanate. Since the latter is usually the most expensive component of the resin, often much more expensive than the polyether polyol, it is obvious that it is desirable to use a minimum thereof consistent with the provision of products having a desired degree of dimensional stability under the effects of severe temperature conditions and/or presence of moisture.

This invention is based upon the discovery that in the production of foams of sucrose polyether polyols and an organic polyisocyanate, the foregoing problems are in large measure solved, or at least reduced to a minimum, by incorporating into the sucrose polyether polyol an added polyether polyol which is an oxyalkylation product of a compound containing two or more hydroxyaryl groups attached to one or more alkylene radicals.

The polyphenol which is subjected to oxyalkylation to provide the latter polyether polyol comprises a plurality of hydroxyaryl groups linked together by one or more alkylene groups. They may be represented by the generalized structure:

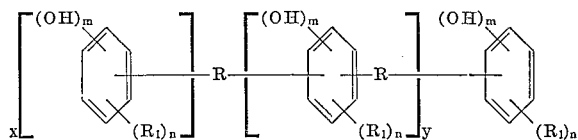

wherein R is an alkylene radical which may be of a molecular weight up to about 700, $R_1$ is an aliphatic radical containing 1 to about 12 carbon atoms, or halogen, $m$ is a number from 1 to 3, $n$ is a number from 0 to 3, $x$ is a number from 1 to 3, and $y$ is a number from 0 to 6.

The interaction of the highly functional polyether polyols of sucrose with oxyalkylation products of a polyphenol to form products which will in turn interact with organic polyisocyanates to form dimensionally stable polyurethane foams, is unusual because when oxyalkylation products of polyols of lower functionality than sucrose have been combined with oxyalkylation products of a polyphenol and reacted with an organic polyisocyanate under foaming conditions, the foams do not exhibit the desired dimensional stability in the presence of moisture or when subjected to severe temperature conditions. Some of the polyols of lower functionality than sucrose which have failed in this regard are sorbitol, pentaerythritol and glycerol.

In the practice of this invention, the polyether polyol blends resulting from the mixing or blending of the preformed oxyalkylation products of a polyphenol and a preformed oxyalkylation product of sucrose may be used to form a polyurethane foam having high resistance to the dimensional changes when exposed to high temperature and high humidity.

A polyphenol may also be blended with the oxyalkylation products of sucrose which are oxyalkylated only to an intermediate degree and the mixture may then be further, or conjointly, oxyalkylated with an alkylene oxide containing about 2 to about 4 carbon atoms per molecule to obtain a further degree of oxyalkylation. Usually, the oxyalkylation is continued beyond the stage at which 1 mole of alkylene oxide per hydroxyl group of the total of the sucrose and the polyphenol is introduced. The total of alkylene oxide reacted with the sucrose and the polyphenol may be as high as about 1 to 4 moles per available hydroxyl group.

Various alkylene oxides containing from 2 to 4 carbon atoms may be used to effect oxyalkylation, but propylene oxide, or at least a substantial amount of propylene oxide, is preferred in the polyphenol component. In oxyalkylating sucrose, either ethylene oxide or propylene oxide or blends of the two, produce good results. Butylene oxide may also be used.

The blends of oxyalkylation products or the products of conjoint oxyalkylation may be reacted with an organic polyisocyanate and a blowing agent in order to form a polyurethane foam having the improved properties previously described. To this end, blends of oxyalkylation products or the conjoint oxalkylation products may be mixed with an appropriate amount, depending upon the hydroxyl content of the oxyalkylation products, of an organic polyisocyanate, and then with a blowing agent, such as water or a low boiling chlorofluorocarbon. In many instances, a small amount of a catalyst for urethane formation and a surfactant are also added. Such catalyst is represented, for example, by the tertiary amines and the organic acid tin salts, such as stannous octoate or dibutyl tin dilaurate. After the catalyst is added, the mixture is foamed either with or without application of external heat.

The polyurethane resin may be formed either by a so-called "prepolymer method" wherein the binary mixture of oxyalkylation products of sucrose and a polyphenol are mixed with an excess of polyisocyanate, but without catalyst and usually without blowing agent, to provide a stable, liquid, polyurethane-type prepolymer or quasi-prepolymer that contains excess isocyanate groups in the terminal position. These groups can react with the hydroxyl groups of the added polyol to form a urethane resin.

The prepolymers can be stored until it is desired to convert them to foams, at which time they are further blended with added polyol (usually, but not necessarily, the same as that used initially) to provide hydroxyls that will react with the available isocyanate groups, ordinarily in the presence of a catalyst for urethane formation and with a surfactant. A blowing agent, such as water or a chlorofluorocarbon, is also added and the composition is then foamed and cured to a relatively strong, water resistant and stable state.

The polyether polyols from oxyalkylation of sucrose and a polyphenol prepared as above described, may also be foamed and cured by the so-called "one shot" or single stage method wherein the polyether polyol components and the organic polyisocyanate are kept separate substantially until they are to be foamed and cured, thus avoiding premature gelation. In this "one shot" technique, a number of components which are not reactive with respect to each other are mixed to provide a stable package. For example, the blowing agent, the catalyst for urethane formation, an emulsifier, and sometimes other modifiers are usually mixed with the polyether polyol component to provide such package, which may be designated as package II. The total amount of organic polyisocyanate required in the reaction may then be added as package I. Other distributions of the components may be made so long as the polyol and the organic polyisocyanate are kept separate.

When the blowing agent employed to produce cellulation of the polyurethane mixture is nonreactive with respect to the polyisocyanate (as in the instance of low boiling chlorofluorocarbon), it may be premixed into either the polyisocyanate component or the polyol component of the foamable mixture before the two components are incorporated with each other to provide the complete foamable and curable mixture. It is also possible that mixtures of different chlorofluorocarbons may be incorporated to provide variation in the rate of expansion of the resultant foams.

In forming foams, considerable variation in the starting ingredients is possible. The preferred source of sucrose, constituting the starting material for one polyether polyol component, comprises conventional granulated sugar, which is abundant, inexpensive and of high purity. However, other materials containing large amounts of sucrose may also be utilized. These comprise incompletely refined grades of sugar, such as brown sugar, and the syrups, such as corn syrup, and molasses, and other syrup or mollasses products may also be mixed with sucrose, such as cane sugar, to provide a sucrose solution which can be oxyalkylated and blended with polyphenols as herein disclosed.

The alkylene oxide component of the polyether polyol comprises oxides containing 2 to 4 carbon atoms, for example, ethylene oxide, propylene oxide, butylene oxide, and mixtures thereof.

In order to effect oxyalkylation of the sucrose, a mixture thereof and water containing about 5 to about 90 percent of water based upon the total mixture, is placed in a pressure container, such as an autoclave. An oxyalkylation catalyst, such as sodium or potassium hydroxide, or sodium or potassium carbonate, is employed in small amount, e.g., about 0.3 perecnt by weight to about 20 percent by weight based upon the sucrose, and the alkylene oxide is added gradually at a pressure below about 200 pounds per square inch and at a temperature between about 70° F. and about 270° F. until approximately 10 to about 25 moles thereof have been reacted with the sucrose. The oxyalkylation product of sucrose may be neutralized by treatment with an ion exchange resin or by addition of acids, such as hydrochloric acid, in controlled amount. All, or almost all, of the water may then be distilled off to leave a liquid but viscous polyether polyol.

As previously mentioned, this technique may be varied by only partially oxyalkylating sucrose in the presence of water and alkali until an oxyalkylation product containing 3 to about 9 moles of alkylene oxide per mole of sucrose and wherein the alkylene oxide is soluble in the partial product attained, and then distilling off all, or most, of the water. Further alkylene oxide is then added until a desired degree of oxyalkylation is attained. The resultant product may be neutralized, as previously described, by treatment with an ion exchange resin or by addition of acid. These partially oxyalkylated sucrose polyethers are believed to possess substantially the following structure:

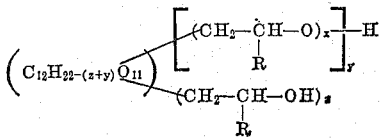

wherein R is selected from a group consisting of H and alkyl radicals containing 1 to 3 carbon atoms, $x$ is a number from 0 to about 6, and the sum of the numbers $z+y$ is from 3 to 8.

Oxyalkylation products of sucrose suitable for use in the practice of this invention may also be obtained by reacting sucrose with alkylene oxide in the presence of a tertiary amine, as disclosed in United States Letters Patent, Nos. 2,927,918 and 2,902,478.

In preparing an oxyalkylation product of a polyphenylol by separate oxyalkylation of a polyphenylol or by oxyalkylating a mixture of said polyphenylol and a partial oxyalkylation product of sucrose, various polyphenols may be used. One preferred class of polyphenols is represented by the so-called "novolac" resins, which are non-heat hardening condensation products of a phenol containing one or more hydroxyl groups and an aldehyde. Phenol per se is the more common phenol utilized in novolac resins, but it may also be replaced by cresol, xylenol, hydroquinone, catechol, and similar phenols wherein hydroxyl groups are substituted for hydrogen in a benzene ring or a benzene ring containing alkyl or chlorine substituents, or other nonfunctioning groups as side chain substituents.

Formaldehyde is the preferred carbonyl component in the preparation of the polyphenols, but it may be replaced by other aldehydes or even ketones. Such replacements are represented by acetaldehyde, propionaldehyde, butyraldehyde, furfural, benzaldehyde, o- or m-hydroxybenzaldehyde, acetone, or compounds containing a plurality of carbonyl groups, such as glyoxal, phorone or the like. The resultant polyphenols have the structures represented as follows:

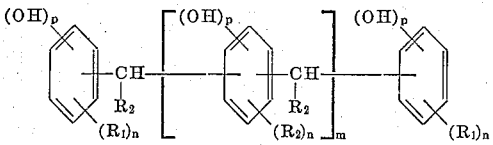

wherein $R_1$ is a group selected from hydrogen and alkyl, $R_2$ is a group selected from the class consisting of hydrogen or alkyl with less than 5 carbon atoms, $p$ is a number from 1 to 3, $n$ is a number from 0 to 3, and $m$ is a number from 0 to 6. Other molecules may be present, but the foregoing structure is typical. The preferred novolac resins have a functionality per molecule of about 2.5 to about 6 or 7, and a hydroxyl number of about 200 to 600.

Novolac type resins may be prepared from relatively inexpensive ingredients which are available commercially. When the oxyalkylation products of novolac resins are employed with the separately or conjointly formed sucrose polyether polyols in the production of polyurethane foams, excellent cellulated products of a high order of dimensional stability under adverse conditions of high humidity and high temperature are obtained. These products also have an especially low water vapor transmission.

Apparently, when a novolac resin or other polyphenol is oxyalkylated in accordance with the provisions of this invention, the active hydrogens of the phenolic hydroxyls are converted to alkyl ether chains on the benzene rings similar to those of the sucrose oxyalkylation products herein disclosed. These chains are terminated by hydroxyl groups, thus providing polyether polyphenol products suitable for blending with the polyether polyols of sucrose.

Other polyphenols which are related to the novolac resins and which may be oxyalkylated separately or concurrently with the sucrose polyether polyols include bisphenol-A or 2,2-bis(4-hydroxyphenyl)propane, which is of the structure:

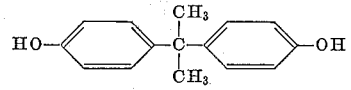

The epoxy resins resulting from condensation of this material with epichlorohydrin in the presence of sodium hydroxide are also included. Many polyphenols containing, for example, three to four phenol groups and methyl, ethyl or propyl-substituted phenol groups may be prepared by reacting a phenol with an unsaturated aldehyde, such as acrolein, ethyl acrolein, crotonaldehyde, or furfural, phorone or others. Polyphenols may also be formed by reacting a hydroxy-substituted aldehyde, such as aldol, with a phenol in the presence of a small amount of an acid or a base as a catalyst.

Tetraphenol-substituted alkanes suitable for oxyalkylation to provide modifiers of sucrose polyether polyols in accordance with this invention may also be prepared by reacting a dialdehyde, such as glyoxal or glutaraldehyde, with a phenolic compound in the presence of a catalytic amount of an acid or a base.

The phenolic component of the polyphenol comprises phenol per se, alkyl-substituted phenols, cresol, xylenol, o-hexylphenol, o-octylphenol, chlorophenol, pentachlorophenol, or bromophenol and others. Likewise, polyhydric phenols, such as resorcinol, catechol, pyrogalol, hexylresorcinol, and other phenols containing a plurality of hydroxyl groups substituted for hydrogen in a benzene ring, may be reacted with an aldehyde or a ketone in the presence of an acid or a basic catalyst to provide a polyphenol-substituted alkane that can be used in the practice of the present invention.

Specific polyphenol-substituted alkanes whose oxyalkylation products may be used with sucrose polyether polyols are disclosed in United States Letters Patent No.

2,754,335. The preparation of valuable polyphenol compounds by reacting a phenol, e.g., phenol per se, and an unsaturated aldehyde, e.g., acrolein, crotonaldehyde, tiglic aldehyde, methylacrolein, ethylacrolein, alpha-hexenealdehyde, in the presence of an acid catalyst is also illustrated in United States Letters Patent No. 2,885,385. Mixtures of these phenols, as well as the segregated compounds, are contemplated for blending with or co-oxyalkylating with sucrose polyether polyols.

Some polyphenols which may be used herein and which comprise a plurality, e.g., three or four or more, of mono- or polyhydroxy benzene groups substituted for hydrogen in a single alkane group are listed as follows:

1,1,3-tris(hydroxybenzyl)propane
1,1,3-tris(hydroxy-3-methylbenzyl)propane
1,1,3-tris(dihydroxy-3-methylphenyl)propane
1,1,3-tris(hydroxy-2,4-dimethylphenyl)propane
1,1,4-tris(hydroxyphenyl)butane
1,1,5-tris(hydroxyphenyl)3-methylpentane
1,1,10-tris(hydroxyphenyl)decane
1,1,3-tris(hydroxyphenyl)2-chloropropane
1,1,2,2-tetrakis(hydroxyphenyl)ethane
1,1,3,3-tetrakis(hydroxy-3-methylphenyl)propane
1,1,4,4-tetrakis(hydroxyphenyl)butane Another species of polyphenol which may be utilized contains large amounts of a triphenylol represented by the structure:

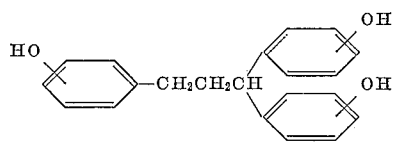

This material is termed 1,1,3-tris(hydroxyphenyl)propane. The commercial product has a molecular weight of 320.7 and a hydroxyl number of about 500 to 525.

Still another type of polyphenol which may be used in the practice of this invention is represented by the hydroxyphenylated petroleum resins such as are disclosed as intermediate products in United States Letters Patent No. 3,010,920 to Greenlee, incorporated herein by reference. In accordance with the patent disclosure, petroleum resins such as are obtained in the cracking steps involved in the preparation of motor fuels and being of relatively high degree of unsaturation, may be subjected to hydroxyphenylation. Suitable resins for this process have iodine values within a range of about 119 to about 475. The double bonds per average molecule are described as being within a range of about 2.34 to about 6.37.

These unsaturated resins can be hydroxyphenylated with various phenols, such as phenol per se, cresol, resorcinol and the like, using as a catalyst a coordination product of boron trifluoride, such as boron trifluoride etherate. By application of this process, hydroxyphenylated resins are obtained wherein the equivalent weight per hydroxyl group is in a range between about 217 and about 497. The minimum hydroxyl group per molecule of the hydroxyphenylated resin is within a range of 1.21 to 18.9. These hydroxyphenylated resins can be reacted with one of the lower alkylene oxides herein disclosed, e.g., propylene oxide, to provide oxyalkylated derivatives. The oxyalkylation may be effected upon the hydroxyphenylated petroleum resin that is then blended with highly oxyalkylated sucrose or upon blends thereof with a partially oxalkylated sucrose material in order to provide mixed oxyalkylated sucrose and oxyalkylated derivatives of the hydroxyphenylated petroleum resin. The oxyalkylation products thus obtained may be reacted with an organic diisocyanate, such as toluene diisocyanate, in admixture with a blowing agent to provide a polyurethane foam. The prepolymer or the "one shot" system may also be used in forming and curing the foam.

In addition to the numerous polphenols disclosed hereinabove, any other polyphenols, that is, aromatic compounds or resins having two or more ring hydrogen atoms replaced by hydroxyl groups, may also be utilized.

The blends of oxyalkylated sucrose and oxyalkylated polyphenols, or the coreaction products of partially oxyalkylated sucrose and polyphenylols, when further oxyalkylated as herein disclosed, may be combined with various organic polyisocyanates in order to provide foamed polyurethan resins characterized by good resistance to permeation by moisture and by good dimensional stability under adverse temperature conditions.

Suitable organic isocyanates which may be reacted by urethane reaction with the blends and co-oxyalkylation products herein disclosed to form stable, cured foams are listed as follows:

Toluene diisocyanate
Diphenyl diisocyanate
Triphenyl diisocyanate
Chlorophenyl-2,4-diisocyanate
Ethylene diisocyanate
1,4-tetramethylene diisocyanate
p-Phenylene diisocyanate
Hexamethylene diisocyanate
3,3'-dimethyl-4,4'-biphenylene diisocyanate
3,3'-dimethoxy-4,4'-biphenylene diisocyanate
Polymethylene polyphenol isocyanate
Diphenylmethane-4,4'-diisocyanate Mixtures of two or more of these diisocyanates are contemplated.

Prepolymers or quasi-prepolymers of polyols and organic diisocyanates which contain a plurality of available isocyanate groups per molecule may also be regarded as being organic polyisocyanates within the broad terminology herein employed. One organic polyisocyanate which can readily be obtained commercially consists of a mixture of 80 percent of 2,4-toluene diisocyanate and 20 percent of 2,6-toluene diisocyanate. Another commercial material which may be used is a 65 percent–35 percent mixture of the same isomers of toluene diisocyanate. A still further material which may be used is an impure mixture of toluene diisocyanates often used commercially in forming polyurethane resins.

The relative amount of organic polyisocyanate utilized is susceptible of variation over a substantial range. Usually, they will be employed in an amount at least approximately equivalent to the total hydroxyl groups in the total polyol component. Some of the organic polyisocyanates tend to evaporate; therefore, it may be desirable to compensate for this loss. A range of about ½ equivalent to about 2 equivalents of organic isocyanate per equivalent of polyol component in the final material is ordinarily used, but is not critical.

In order to obtain polyurethane resins embodying as a polyol component co-oxylalkylated or blended polyols as herein disclosed, prepolymers or quasi-prepolymers may first be prepared by reacting an excess of organic diisocyanate with a part of said polyol component. All or most of the total organic polyisocyanate component may thus be reacted with about 10 percent to about 20 percent of the total of the polyol component of the final polyurethane resin whereby to give prepolymer molecules, each of which contains available, e.g., two or more, isocyanate groups.

To promote the polyurethane linkage reactions in the final curing of the polyurethane resins, catalysts are usually required. Many of these comprise tertiary amines or hydroxy amines, organic salts of tin, and the like. The following constitutes a partial list of catalysts from which selection may be made:

Tetramethylethylenediamine (anhydrous) (TMEDA)
Tetramethyl guanidine (TMG)

Tetramethyl-1,3-butanediamine (TMBDA)
Trimethylene diamine (DABCD) of the formula:

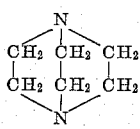

Dimethylethanolamine (DMEA)

Tin esters, such as:

Stannuos oleate
Stannous octoate
Dibutyl tin dilaurate

Many other catalysts may be substituted therefor, if so desired. The amount of catalyst used may be in a range of about 0.5 to about 5 percent or more by weight based upon the total of the polyols employed. Mixtures of the above catalysts may also be utilized.

To impart a foamed or cellular structure to the blended polyol-polyisocyanate mixture, a suitable gassing agent or system of gassing agents must be added. A number of these are available. The liquid but relatively volatile halocarbons, such as the following perhalocarbons containing 1, 2 or even 4 carbon atoms, are especially desirable for the purpose.

| | |
|---|---|
| $CCl_3F$ | $CHCl_2F$ |
| $CCl_2F_2$ | $CClF_3$ |
| $C_2Cl_2F_4$ | $CHClF_2$ |

These are added as liquids to the blended polyol-polyisocyanate mixtures or to one or more components thereof, and are subsequently volatilized in the liquid mixture to effect cellulation. Subsequently, the mixture cures to a hardened state.

In order to obtain relatively uniform distribution of the various components of the liquid system and to obtain proper cellulation, an emulsifier and/or surfactant may be incorporated into the mixture. These materials are physical in their effect and are not always necessary, especially if denser foams are desired. Many hundreds of these are available as commercial products. Some of these are listed in the publication, Detergents and Emulsifiers—Up to Date 1960, published by John W. McCutcheon, Inc., 475 5th Ave., New York 17, N.Y.

Examples of surfactants which may be used include the so-called Pluronics, which have been described as being condensates of ethylene oxide with a hydrophobic base formed by condensing propylene oxide with proylene glycol. These are of a molecular weight in a range of about 2000 to about 8000 and are ascribed the structure:

$$HO(C_2H_4O)_a(C_3H_6O)_b(C_2H_4O)_cH$$

Members of this family are designated as:

| | |
|---|---|
| L-61 | P-75 |
| L-44 | F-68 |
| L-62 | P-84 |
| L-64 | |

Another class of surfactants comprises the so-called Tetronics, which are formed by the addition of propylene oxide to ethylene diamine, followed by the addition of ethylene oxide. These compounds have been ascribed the structure:

Another valuable class of surfactants comprises the so-called Tweens, which are described as the monoesters of higher fatty acids, represented by lauric acid, stearic acid and oleic acid, and polyoxyethylene sorbitan. Members of the series are represented by:

| | |
|---|---|
| Tween 20 | Tween 65 |
| Tween 21 | Tween 80 |
| Tween 40 | Tween 81 |
| Tween 60 | Tween 85 |
| Tween 61 | |

Another of the more satisfactory surfactants which has been found very effectively to maintain the cell structure in the foaming and curing of polyurethane resins comprises soluble, liquid derivatives of the silicones. One such product is of the approximate structure:

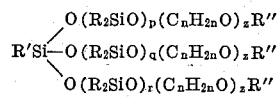

in which R', R and R'' are monovalent hydrocarbon radicals; $p$, $q$ and $r$ are integers equal to at least 1 and may be considerably higher, e.g., 2, 3, 4, 5, 6 or a higher number up to about 20; $n$ is a number about 2, 3 or 4; and $z$ is an integer equal to at least 5 and may be higher, e.g., 6, 7, 8, 9, 10 or even higher, up to about 25. One such material is sold as Dow Corning-199. Still another highly useful silicone base surfactant comprises the so-called Silicone L-521 which has the formula:

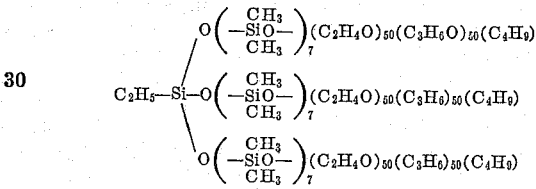

Other surfactants, especially the liquid or soluble non-ionic ones, are useful. The surfactants may be employed in amounts within a range of about 0.1 to about 3 percent by weight based upon the mixture of polyol component and the organic isocyanate component. In relatively dense foams, for example, those weighing about 5 or 6 pounds and upward per cubic foot, the surfactants may be omitted entirely.

The following examples are illustrative of the preparation of a few typical polyphenols by reaction of a monomeric phenol with an aldehyde and which may be used for preparation of mixed polyols in accordance with the provisions of this invention.

*Example A*

In this example, the polyphenol was a condensation product of phenol and an aldehyde. It was prepared by mixing 6650 grams of phenol with about 7 moles (617 grams) of aldol and a small amount of a catalyst, namely, 11 milliliters of concentrated hydrochloric acid. When the aldol was all in the mixture, said mixture was held at a temperature of about 45° C. to 55° C. for 30 minutes. The mixture was then heated at 100° C. for 2 hours. The reaction product was stripped of unreacted phenol to a pot temperature of 200° C./12 millimeters Hg. The resultant product has an OH of 516, which is suitable for interacting with an alkylene oxide, either singly or in combination with a partial sucrose polyol as herein disclosed, in forming a polyol blend useful for reacting with polyisocyanates in the formation of polyurethane resins.

*Example B*

This example is illustrative of the preparation of a polyphenol from phenol and paraldehyde. The reaction mixture comprised:

| | |
|---|---|
| Phenol | 620 grams (6.6 moles). |
| Paraldehyde | 44.1 grams (0.33 mole). |
| Catalyst (concentrated hydrochloric acid) | 2 milliliters. |

The paraldehyde was added dropwise to the phenol and catalyst, and the mixture warmed up by exothermal reaction. The product was stripped of excess phenol up to a pot temperature of 210° C./12 millimeters vacuum. A yield of 214 grams of a phenol-acetaldehyde resin was obtained. The product had a hydroxyl value of 500 as against a theoretical hydroxyl value of 525. This product could also be reacted with an alkylene oxide and reacted either singly or by coreaction with a sucrose polyether polyol as herein disclosed, in order to provide a blended polyol useful for the formation of polyurethane resin foams.

Example C

In accordance with this example, a polyphenol is prepared by the reaction of a phenol and furfural. The reaction is effected by mixing:

Furfural _____ 96 grams (1 mole).
Phenol _____ 620 grams (6.6 moles).
Catalyst (sodium hydroxide) ___ 6.2 grams.

In the reaction, the furfural was added to the phenol dissolved in 300 milliliters of toluene as a nonreactive diluent. The mixture was refluxed at 135° C. and at the conclusion of the reaction, the excess phenol and toluene were removed by vacuum stripping. A yield of 266 grams of a polyphenol having an OH value of 421 was obtained.

The polyphenols of Examples A, B and C, as well as other polyphenols, may be blended with partial sucrose polyether polyols, as for example, a sucrose polyether polyol containing 6 moles of propylene oxide or ethylene oxide, or a blend of the two alkylene oxides, per molecule of sucrose. Such partial polyol of sucrose is satisfactorily prepared as a first stage reaction product in the two-stage method described hereinabove. In this stage, water and alkali are added to the sucrose and oxyalkylation is conducted under pressure in an autoclave. When from about 3 to about 9 moles of alkylene oxide have been reacted, water is evaporated under vacuum to provide a substantially anhydrous product.

In accordance with the present invention, the anhydrous material is then blended with the polyphenol and the two are further oxyalkylated to provide a blended product containing, for example, from about 1.0 to about 4.0 moles of alkylene oxide, e.g., propylene oxide or ethylene oxide, or a blend of the two, per hydroxyl group of the sucrose and polyphenol.

The following example is illustrative of the procedure involved in the preparation of a conjoint oxyalkylation product of a blend of a partial sucrose polyether polyol and a polyphenol.

Example D

In accordance with the provisions of this example, the sucrose polyether polyol containing 6 moles of propylene oxide per mole of sucrose was blended with the aldol-phenol reaction product of Example A. The composition comprised:

Sucrose polyether polyol __ 693 grams (1.0 mole).
Aldol-phenol _____ 505 grams (1.5 equivalents).
Nonreactive solvent (dimethyl ether of diethylene glycol) _____ 125 milliliters.

A basic catalyst, e.g., 0.5 to 5 percent by weight based upon the mixture, of sodium hydroxide or potassium hydroxide may be present to promote the reaction. This catalyst may be from the initial oxyalkylation of the sucrose.

The foregoing mixture was introduced into an autoclave, purged with nitrogen gas, and 1061 grams (18.25 moles) of propylene oxide was added over a period of 2.5 hours. The reaction was exothermic, the highest temperature attained being 235° F. The reaction was continued until the pressure dropped approximately to atmospheric value. The autoclave was drained and the product neutralized with an ion exchange resin as previously described, until a pH value of 5.3 was attained. The characteristics of the product were:

Hydroxyl value _____ 397.4
Viscosity, centipoises _____ 126,000
Propylene oxide content, moles _____ 24.25

The same or similar techniques may be employed in the oxyalkylation of the other blends of alkyl polyols and polyphenols herein disclosed. Also, similar techniques may be applied to the separate oxyalkylation of sucrose or a polyphenol to provide oxyalkylation products which can be blended separately prior to the addition of an organic polyisocyanate in the formation of polyurethane foams. Thus, sucrose may be oxyalkylated in two stages, as shown in the aforementioned patent, to provide a product which is substantially anhydrous and contains 10 to 20 or 30 moles of alkylene oxide reacted therein. This mixture can readily be blended with one of the polyphenols herein disclosed that has been oxyalkylated with 1, 2, 3, 4 or more equivalents of an alkylene oxide.

The steps involved in preparing other oxyalkylation products are similar to those described in Example D, the variations being essentially in the several ingredients or the amounts thereof. The components, as well as the other main characteristics of a series of polyols which have been prepared, are tabulated in Table I.

TABLE I.—POLYOLS

| Polyol No. | Starting Polyol | Amount Moles | Starting Polyphenol | No. of Polyphenol Equivs. | Total Moles Alkyl Oxide | | Hydroxyl No. | Viscosity, 77° F., cps. |
|---|---|---|---|---|---|---|---|---|
| | | | | | PO | EO | | |
| 1[1] | Sucrose (S) | 1 | No polyphenol | | 11 | 4 | 472.9 | 26,200 |
| 2[1] | do | 1 | do | | 19.7 | | 386.6 | 8,700 |
| 3[2] | | | Phenol-aldol (A) | 1 | 2 | | 272.4 | 61,000 |
| 4[2] | | | Phenol-formaldehyde (N) | 1 | 3 | | 252.0 | 470,000 |
| 5[3] | Sucrose (S) | 1 | do | 3 | 23.8 | | 393.0 | 112,000 |
| 6[3] | do | 1 | do | 3 | 16 | 4 | 389.3 | 214,000 |
| 7[3] | do | 1 | Phenol-aldol (A) | 1.5 | 24.31 | | 397.4 | 126,000 |
| 8[3] | do | 1 | Phenol-acrolein (PA) | 3.75 | 21.6 | | 379.2 | 360,000 |
| 9[3] | do | 1 | Phenol-furfural (PF) | 0.75 | 15.7 | | 409.9 | 46,000 |
| 10[3] | do | 1 | Phenol-acetaldehyde (PAc) | 0.75 | 15.7 | | 415.7 | 56,000 |
| 11[3] | do | 1 | Bisphenol A (B) | 0.366 | 15.7 | | 408.1 | 58,050 |
| 12[3] | do | 1 | Tetrabromobisphenol A (TB) | 0.366 | 15.7 | | 394.5 | 192,000 |
| 13[4] | Pentaerythritol (PE) | 1 | Phenol-formaldehyde (N) | 0.375 | 2.6 | | 380.3 | 21,800 |
| 14[4] | Sorbitol (SO) | 1 | do | 3.0 | 20.0 | | 390.9 | 20,000 |
| 15[4] | Glycerol (G) | 1 | do | 3.0 | 10.9 | | 351.3 | 117,000 |
| 16[1] | Sucrose (S) | 1 | No polyphenol | | 15 | | 470.3 | 68,000 |

[1] Control, sucrose polyether polyol singly.
[2] Control, polyphenol polyol singly.
[3] Applicants' invention, sucrose polyols plus polyphenols.
[4] Control, polyphenol plus other polyols than sucrose.

NOTE:
Hydroxyl No.=Hydroxyl number of final polyether polyol.
Viscosity=Viscosity of final polyether polyol.
Equivs.=Equivalent weight of polyphenol per hydroxyl group in starting polyphenol.
PO=Propylene oxide.
EO=Ethylene oxide.

To several of the foregoing polyether polyol blends were added excesses of toluene diisocyanate as an 80/20 mixture of 2,4-isomers and 2,6-isomers, thus forming so-called prepolymers containing reactive isocyanate groups. The compositions and properties of the resultant prepolymers are shown in Table II.

the process, prepolymers of the sucrose polyether polyol and toluene diisocyanate which corresponded to 1A and 2A of Table II were used.

In the compositions of tests A and B, the prepolymers 1A and 2A, respectively, were employed as first packages (I). The remaining components were mixed as second

TABLE II.—COMPOSITION AND PROPERTIES OF PREPOLYMERS

| Prepolymer No. | Mixed Polyol No. From Table I | Percent Resin | Percent Toluene Diisocyanate | NCO Equivalent No. | Gardner-Holdt Viscosity |
|---|---|---|---|---|---|
| 1A | 1 | 21.0 | 79.0 | 139.1 | V. |
| 2A | 2 | 23.0 | 77.0 | 141.3 | T+¼. |
| 3A | 3 | 26.5 | 73.5 | 141.9 | N+½. |
| 4A | 4 | 23.8 | 76.2 | 136.2 | L+½. |
| 5A | { 1 / 4 | 13.1 / 9.4 } | 77.5 | 139.9 | U. |
| 6A | { 16 / 4 | 13.1 / 9.1 } | 77.8 | 143.0 | U. |
| 7A | 5 | 21.8 | 78.2 | 136.4 | U. |
| 8A | 6 | 21.8 | 78.2 | 136.3 | T+¾. |
| 9A | 7 | 20.0 | 80.0 | 130.2 | G+. |
| 10A | 8 | 22.3 | 77.7 | 136.1 | T+¼. |
| 11A | 9 | 21.0 | 79.0 | 136.7 | Q+½. |
| 12A | 10 | 20.5 | 79.5 | 133.8 | Q+¼. |
| 13A | 11 | 21.5 | 78.5 | 137.7 | T+½. |
| 14A | 12 | 21.0 | 79.0 | 134.4 | M+½. |
| 15A | 13 | 23.0 | 77.0 | 141.2 | U. |
| 16A | 14 | 22.0 | 78.0 | 138.2 | R+¾. |
| 17A | 15 | 24.0 | 76.0 | 140.8 | V+½. |
| 18A | 16 | 21.0 | 79.0 | 138.0 | V+¾. |

NOTE: The toluene diisocyanate was a mixture of 80 percent 2,4-isomer and 20 percent 2,6-isomer.

For a clearer understanding of the effects of the combination of oxyalkylation products of sucrose and polyphenols upon the properties of polyurethane foams, and especially with respect to stabilization against the effects of moisture, reference is made to the following examples, wherein Examples I, II and III constitute controls which do not contain the complete combination of oxyalkylation products of sucrose and a polyphenol. The controls comprise, respectively:

Foams of sucrose polyether polyols taken singly;
Foams from certain polyphenols taken singly; and
Foams from oxyalkylation products of phenols and certain aliphatic polyols of a functionality of six or lower.

As will subsequently be apparent, all of these control foams failed in high humidity aging. Some of them showed poor dimensional stability at high and low temperatures.

packages (II). The two packages were mixed to provide a liquid mixture just before the foams were to be formed. Other distributions of the several ingredients could be effected, provided the material containing isocyanate groups and the polyol and catalyst are kept apart until just before foaming is to be effected.

The two packages, after being mixed, were allowed to foam and cure, and samples were then tested for dimensional changes over a period of 48 hours at 200° F. and at −12° F. They were also subjected to high humidity aging at 158° F. and at a relative humidity of 95 percent for one week. They were then examined for splitting and dimensional changes. The test data are indicated below the line in the following table.

TABLE FOR EXAMPLE I.—FOAMS
[Control (Sucrose Polyether Polyols Singly)]

| | Prepolymer From Table II | Polyol From Table I | Test A | Test B |
|---|---|---|---|---|
| 1A | | | 100.0 [1] | |
| 2A | | | | 100.0. [1] |
| | | 1 (SPE) | 86.0 | 101.0 |
| | | 2 (SP) | | |
| L-521 (Emulsifying agent) | | | [2] 1.0 | [2] 1.0 |
| DABCO (Catalyst of urethane formation) | | | 0.6 (TMEDA) [3] | 1.0 |
| CCl₃F (Blowing agent) | | | 33.2 | 36.0 |
| Density, pounds per cubic foot | | | 1.81 | 1.96. |
| 200° F., 48 hours, percent expansion (linear) | | | 1 | 4–5. |
| −12° F., 48 hours, percent shrinkage (linear) | | | 1.1 | 0.55. |
| Water vapor transmission, perm inch | | | 2.70 | 2.28. |
| 158° F., 95 percent relative humidity, 1 week, percent expansion (linear). | | | 10–13 | 1–3. |
| Behavior under humidity aging | | | Splitting | Splitting. |

[1] Package I.
[2] Package II.
[3] TMEDA = Tetramethylethylenediamine.
(SPE) = Sucrose plus propylene oxide plus ethylene oxide.
(SP) = Sucrose plus propylene oxide.
Perm = A perm is a unit measuring rate of water vapor transmission wherein 1 perm equals a transmission rate of 1 grain of water per square foot of area per hour per inch of mercury difference in humidity pressure within and without a cup containing water and over which the sample is sealed. The sample may be one inch thick.

Example I.—Foams

[Control (sucrose polyether polyol singly)]

This example comprises control tests A and B wherein polyether polyols based upon sucrose, and thus having a functionality higher than six hydroxyl groups, are used singly in the preparation of a polyurethane foam. In All of the foams from the sucrose polyether polyols taken singly were subject to failure by splitting. These foams were not suitable for use under conditions, as for instance, as thermal insulation in refrigerated devices, wherein considerable moisture might be encountered. The water vapor transmission of these foams is also very high when compared to the prepolymer foams of this invention.

Example II.—Foams

[Control (phenol-aldehyde polyether polyols singly)]

This example is a control that illustrates the lack of stability characterizing a polyurethane foam wherein a polyphenol singly is employed as the polyol component of the foam.

TABLE FOR EXAMPLE II.—FOAMS
[Control (phenol-aldehyde polyether polyols singly)]

| Prepolymer From Table II | Polyol From Table I | Test A | Test B |
|---|---|---|---|
| 3A | | 100.0 [1] | 100.0.[1] |
| 4A | | | |
| | 3 (A) | 145.0 | 155.0. |
| | 4 (N) | | |
| L-521 (Emulsifying agent) | | [2] 1.1 | [2] 1.2. |
| DABCO (Catalyst of urethane formation) | | 1.4 | 1.5. |
| CCl₃F (Blowing agent) | | 43.7 | 45.5. |
| Density, pounds per cubic foot | | 2.10 | 2.24. |
| −12° F., 48 hours, percent shrinkage (linear) | | 0.56 | 0.94. |
| 200° F., 48 hours, percent expansion (linear) | | 40–50 | 3–10. |
| 158° F., 95 percent relative humidity, 1 week, percent expansion (linear) | | 25–30 | 3–6. |
| Behavior under humidity aging | | Split | Split. |
| Water vapor transmission, perm inch | | 1.67 | 1.60. |

[1] Package I.
[2] Package II.
(A) = Aldol plus phenol.
(N) = Formaldehyde plus phenol.

The techniques of foaming and curing were essentially the same as in Example I.

Again it will be observed that the resultant foams were subject to failure by splitting when exposd to high humidity conditions and exhibited high expansion when exposed to 200° F. heat.

Example III.—Foams

[Control (polyphenol+aliphatic polyol of low functionality)]

This example is a control illustrating the lack of stability under high humidity conditions in a foam comprising the oxyalkylation products of a polyphenol and an aliphatic polyol of a functionality of six or lower per molecule.

In formulating the foams of tests A, B and C, the techniques of Example I were followed. The formulation of the foams and the properties thereof are tabulated as follows:

The foam was obtained by allowing the mixed packages to foam and cure. The foams were then tested in the manner already described and in each instance, the foams at high humidity were subject to failure by splitting. Obviously, the foams from the alkylation of polyphenols and aliphatic polyols of a functionality of six or lower did not have adequate resistance to moisture permeation. The dimensional stability at 200° F. over a period of 48 hours was rather poor. Some of the samples split in this test also.

The following examples illustrate the preparation of polyurethane foams of high stability at high or low temperature and having particularly good dimensional stability and resistance to cracking under conditions of high humidity, the polyether polyol components comprising products of oxyalkylation of sucrose and a polyphenol.

Example IV.—Foams

[Prepolymer method (conjoint oxyalkylation product of sucrose and polyphenol)]

In this example, excellent foams were prepared in accordance with the provisions of this invention by the prepolymer method. The polyether polyols were of the conjoint oxyalkylation of partly oxyalkylated source containing 3 to 9 moles of alkylene oxide and a polyphenol. The compositions used and the characteristics of the TABLE FOR EXAMPLE III.—FOAMS
[Control (Polyphenol + Aliphatic Polyol of Low Functionality)]

| Prepolymer or Isocyanate From Table II | Polyol No. From Table I | Test A | Test B | Test C |
|---|---|---|---|---|
| 17A | | 100.0 [1] | | |
| 15A | | | 100.0 [1] | |
| 16A | | | | 100.0.[1] |
| | 15 (GNP) | 111.0 | 101.0 | 103.0. |
| | 13 (PE)NP | | | |
| | 14 (SO)NP | | | |
| L-521 (Surfactant) | | [2] 1.0 | [2] 1.0 | [2] 1.0. |
| Catalyst | | [3] D22, 1.3 | DABCO, 1.0 | DABCO, 1.0. |
| CCl₃F (Blowing agent) | | 35.9 | 35.9 | 36.2. |
| Density, pounds per cubic foot | | 2.16 | 1.80 | 1.83. |
| 200° F., 48 hours, percent expansion (linear) | | 11–16 Splits | 15–20 | 12–18. Splits. |
| −12° F., 48 hours, percent shrinkage (linear) | | 0.94 | 0.94 | 0.71. |
| 158° F., 95 percent relative humidity, 1 week, percent expansion (linear) | | 0–3 | 8–16 | 15–18. |
| Behavior under humidity aging | | Splits | Splits | Splits. |
| Water vapor transmission, perm inch | | 1.29 | 1.51 | 1.86. |

[1] Package I.
[2] Package II.
[3] D22 = Dibutyl tin dilaurate.
(GNP) = Glycerol plus phenol-formaldehyde plus propylene oxide.
(PE)NP = Pentaerythritol plus Novolac plus propylene oxide.
(SO)NP = Sorbitol plus Novolac plus propylene oxide.

foamed products will be apparent from the following table:

and then foamed and cured in accordance with the provisions of this invention to provide moisture resistant TABLE FOR EXAMPLE IV.—FOAMS
[Prepolymer method (conjoint oxyalkylation product of sucrose and polyphenol)]

| Prepolymer From Table II | Polyol From Table I | Test A | Test B | Test C | Test D | Test E | Test F | Test G | Test H |
|---|---|---|---|---|---|---|---|---|---|
| 7A | | 100.0 [1] | | | | | | | |
| 8A | | | 100.0 [1] | | | | | | |
| 9A | | | | 100.0 [1] | | | | | |
| 10A | | | | | 100.0 [1] | | | | |
| 11A | | | | | | 100.0 [1] | | | |
| 12A | | | | | | | 100.0 [1] | | |
| 13A | | | | | | | | 100.0 [1] | |
| 14A | | | | | | | | | 100.0 [1]. |
| | 5 (SNP) | 103.0 | | | | | | | 105.0. |
| | 6 (SNPE) | | 104.0 | | | | | | |
| | 7 (SAP) | | | 107.0 | | | | | |
| | 8 S(PA)P | | | | 107.0 | | | | |
| | 9 S(PF)P | | | | | 98.0 | | | |
| | 10 S(PAc)P | (2) | (2) | (2) | (2) | (2) | 99.0 | | |
| | 11 (SBP) | | | | | | (2) | 99.5 | (2) |
| | 12 (STBP) | | | | | | | (2) | |
| L-521 (Emulsifying Agent) | | 1.0 | 1.0 | 1.0 | 1.0 | 1.0 | 1.0 | 1.0 | 1.0. |
| DABCO (Catalyst) | | 1.0 | 0.7 | 1.1 | 1.1 | 1.3 | 1.3 | 1.3 | 1.3. |
| CCl₃F (Blowing Agent) | | 36.2 | 36.3 | 32.7 | 37.0 | 35.4 | 35.5 | 35.6 | 36.6. |
| Density, pounds per cubic foot | | 1.99 | 1.80 | 1.89 | 1.85 | 1.96 | 1.93 | 1.88 | 2.00. |
| 200° F., 48 hours, percent expansion (linear). | | 1 | 2–5 | 1 | 0 | 2–3 | 1–2 | 1–2 | 1–2. |
| –12° F., 48 hours, percent shrinkage (linear). | | 1.1 | 1.2 | 0.94 | 1.25 | 0.63 | 0.47 | 1.25 | 1.25. |
| 158° F., 95 percent relative humidity, 1 week, percent expansion (linear). | | 6–13 | 10–15 | 4–6 | 2–4 | 6–10 | 7–10 | 4–6 | 3–4. |
| Behavior under high humidity aging. | | (3) | (3) | (3) | (3) | (3) | (3) | (3) | (3). |
| Water vapor transmission, perm inch. | | 1.30 | 1.37 | 1.64 | 1.37 | 1.39 | 1.47 | 1.72 | 1.71. |

[1] Package I.
[2] Package II.
[3] No splitting.
(SNP)=Sucrose plus (phenol plus CH₂O) plus propylene oxide.
(SNPE)=Sucrose plus (phenol plus CH₂O) plus propylene oxide plus ethylene oxide.
(SAP)=Sucrose plus aldol-phenol plus propylene oxide.
S(PA)P=Sucrose plus phenol-acrolein plus propylene oxide.
S(PF)P=Sucrose plus phenol-furfural plus propylene oxide.
S(PAc)P=Sucrose plus phenol-acetaldehyde plus propylene oxide.
(SBP)=Sucrose plus Bisphenol A plus propylene oxide.
(STBP)=Sucrose plus tetrabromobisphenol A plus propylene oxide From the foregoing table it is apparent that the foamed products wherein the polyether polyols were from conjoint oxyalkylation of polyphenols and a sucrose polyether polyol of low alkylene oxide content, good foams resulted. All of the foams were resistant to water vapor transmission and there was no failure by splitting, even under the severe and prolonged conditions of humid aging. These foams would be adapted for use in many environments where they might be exposed to water or water vapor. One application where they would be advantageous would be in the insulation of cold apparatus, such as refrigerators, cold storage rooms, refrigerator trucks and cars, and the like, where low temperatures could be expected to produce condensation of moisture on the cold side of, and subsequent increase of thermal conductivity of the foam. Foams which are of low resistance to moisture permeation are especially subject to failure, even to the extent of failure by cracking and splitting, as disclosed in control Examples I, II and III.

*Example V.—Foams*

[(Blends of separaely oxyalkylated sucrose and a polyphenol)]

While conjointly oxyalkylated polyphenols and sucrose are usually preferred in the formation of the foams of this invention, it is also fully practicable to oxyalkylate the two types of polyols and then to blend the two to provide mixtures that can be reacted with organic polyisocyanates, and then foamed and cured in accordance with the provisions of this invention to provide moisture resistant foams. The composition and properties of these foams are tabulated as follows:

TABLE FOR EXAMPLE V.—FOAMS
[Prepolymer method (blends of separately oxyalkylated sucrose and a polyphenol)]

| Prepolymer From Table II | Polyol From Table I | Test A |
|---|---|---|
| 6A | | [1] 100.0 |
| | 16 (SP) | 59.2 |
| | 4 (NP) | 40.8 |
| L-521 (Emulsifying agent) | | 1.0 |
| DABCO (Catalyst) | (2) | 1.0 |
| CCl₃F (Blowing agent) | | 35.7 |
| Density, pounds per cubic foot | | 1.89 |
| 200° F., 48 hours, percent expansion (linear) | | 2–3 |
| –12° F., 48 hours, percent shrinkage (linear) | | 0.94 |
| 158° F., 95 percent relative humidity, 1 week, percent expansion (linear). | | 11–15 |
| Behavior under high humidity aging | | (3) |
| Water vapor transmission, perm inch | | 1.74 |

[1] Package I.
[2] Package II.
[3] No splitting.
(SP)=Sucrose plus propylene oxide.
(NP)=Novolac plus propylene oxide.

The foamed product from the blends of the separated oxylated polyphenols and sucrose when subjected to humidity aging at 158° F. at 95 percent relative humidity, did not crack or split and was therefore much better than those of control Examples I, II and III.

Example VI.—Foams

[(Sucrose-polyphenol oxyalkylation products—one shot system)]

In accordance with the provisions of this example, a single stage or "one shot" operation was conducted without the preparation of a prepolymer. In the process, a polyether polyol of sucrose wherein the sucrose was partially water-free material was further blended with and alkylation was removed, and subsequently, the substantially water-free mattrial was further blended with and conjointly oxyalkylated with a polyphenol. The mixed oxyalkylated phenols were then mixed with the other components and the mixture was allowed to foam and set. The formulation and test data are tabulated as follows:

total oxyalkylated polyol in the prepolymer, the rest being in the second package polyol. Often, some of the organic polyisocyanate will tend to be lost by volatilization. Some excess of such volatile components may be desired in the organic polyisocyanate mixture.

The blowing agent, such as one or a plurality of the chlorofluorocarbons, may be used in an amount to obtain a predetermined density of the foam. The amount may be in a range of about 2 to about 30 percent by weight based upon the total oxyalkylated polyol, depending upon the density desired in the product. These foams may also be blown with $CO_2$ by inclusion of water in the formulation, or blown with a combination of $CO_2$ from water and a chlorofluorocarbon.

In the examples, some foam stabilizers, e.g., cellulose

TABLE FOR EXAMPLE VI.—FOAMS
[(Sucrose-Polyphenol oxyalkylation products—one shot system)]

| Polyisocyanate | Polyol From Table I | Test A | Test B | Test C |
|---|---|---|---|---|
| 80/20 Toluene diisocyanate | | 59.9* | | |
| Nacconate 4040 [1] | | | 100.0* | |
| Mondur E-172 [2] | | | | 100.0.* |
| | 8 S(PA)P<br>5 (SNP) | 100.0 | 130.0 | 105.0 |
| Surfactant | | **Y-2863,[3] 1.0 | **L-521, 1.0 | **L-521, 1.0 |
| Catalyst | | D22,[4] 1.2 | DABCO, 1.3 | DABCO, 0.9 |
| $CCl_3F$ | | 27.4 | 41.1 | 36.4 |
| Density, pounds per cubic foot | | 1.78 | 1.84 | 1.80 |
| 200° F., 48 hours, percent expansion (linear) | | 2–4 | 1–2 | 0–2 |
| –12° F., 48 hours, percent shrinkage (linear) | | 1.1 | 1.02 | 1.41 |
| 158° F., 95 percent relative humidity, 1 week, percent expansion (linear) | | 6–7 | 4–6 | 2–5 |
| Behavior under high humidity aging | | No splitting | No splitting | No splitting |
| Water vapor transmission, perm inch | | 1.85 | 2.07 | 1.74 |

*Package I.
**Package II.
[1] Nacconate 4040 = Crude toluene diisocyanate.
[2] Mondur E-172 = Crude diphenylmethane-4,4'-diisocyanate.
[3] Y-2863 = An emulsifier of the silicone type.
[4] D22 = Dibutyl tin dilaurate.
(SPA)P = Sucrose + phenol-acrolein + propylene oxide.
(SNP) = Sucrose + Novolac + propylene oxide.

These foams prepared by a "one shot" system wherein the organic polyisocyanate, the total of the polyol content, the catalyst of polyurethane formation, and the blowing agent were all incorporated into the foamable mixture and foamed and cured in a single stage, all had good density characteristics and good dimensional stability at high and low temperatures. There was no cracking or splitting under humid aging.

A relatively wide range of polyphenols may be used in the examples. These phenols may be used in an amount of about 1 percent by weight to about 40 percent or more by weight based upon the total of the oxyalkylated polyols.

In event that the polyphenol and the sucrose are separately oxyalkylated, the total of alkylene oxide reacted may be in a ratio of about 9 to about 40 moles per mole of sucrose, and about 1 to about 4 moles per equivalent weight of polyphenol. An equivalent weight is the weight per hydroxyl group in the polyphenol. Similar total amounts of alkylene oxide based on the polyols may be used in conjointly oxyalkylating a mixture of a polyphenol and a partially oxyalkylated sucrose.

Usually the organic polyisocyanate is used in an amount which is about equivalent to the total of the hydroxyl groups in the two starting oxyalkylated polyols. It is convenient in event that the two-stage or prepolymer method is used in forming the polyurethane foam, to include from about 10 percent to about 25 percent of the ethers or partly hydrolyzed vinyl acetate, may optionally be added, as may flame retarding agents.

We claim:
1. A polyurethane foam formed from a mixture comprising:
   (A) a plurality of oxyalkylated polyhydroxy compounds, one of said polyhydroxy compounds being a polyphenol of the formula:

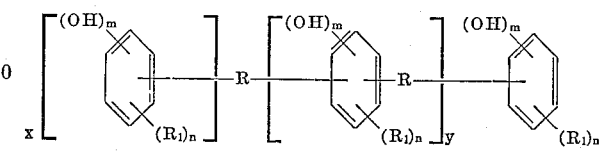

wherein R is an alkylene radical which has a molecular weight up to about 700, $R_1$ is selected from the class consisting of aliphatic radicals containing from 1 to 12 carbon atoms and halogen, $m$ is a number from 1 to 3, $n$ is a number from 0 to 3, $x$ is a number from 1 to 3, and $y$ is a number from 0 to 6; oxyalkylation of said polyphenol being effected by reaction with an alkylene oxide containing about 2 to about 4 carbon atoms, in a ratio of at least one mole of alkylene oxide for each hydroxyl group of said polyphenol; and one oxyalkylated polyhydroxy compound which is an oxyalkylation product of sucrose of the formula:

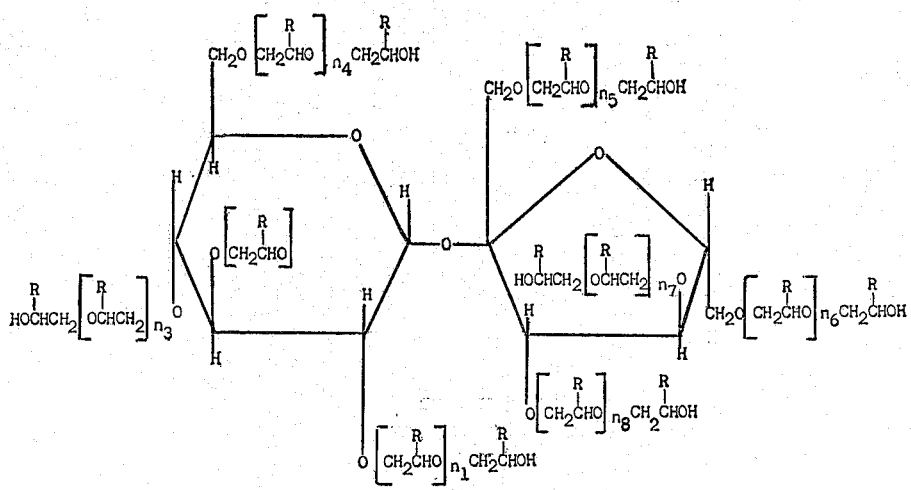

wherein R is selected from the class consisting of hydrogen or methyl, and $n_1$, $n_2$, $n_3$, $n_4$, $n_5$, $n_6$, $n_7$, and $n_8$ are whole numbers from 0 to 8 and their sums being in a range of about 2 to about 18;
(B) an organic polyisocyanate; and
(C) a blowing agent.

2. A foam as in claim 1 where the blowing agent is a chlorofluorocarbon.

3. A foam as in claim 1 where the blowing agent is a mixture of a chlorofluorocarbon and water.

4. A foam as in claim 1 where the polyphenol is selected from the group consisting of a phenol-aldol adduct, a phenol-formaldehyde adduct, a phenol-acrolein adduct, a phenol-furfural adduct, P,P'-isopropylidenediphenol and 4,4'-isopropylidene bis(2,6-dibromophenol).

5. A foam as in claim 4 where the blowing agent is a chlorofluorocarbon.

6. A foam as in claim 4 where the blowing agent is a mixture of a chlorofluorocarbon and water.

7. A polyurethane foam formed from a composition comprising:
(A) a plurality of oxyalkylated polyhydroxy compounds, one of said polyhydroxy compounds being a polyphenol of the formula:

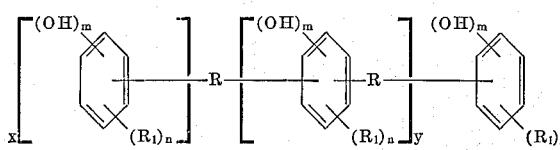

wherein R is an alkylene radical which has a molecular weight up to about 700, $R_1$ is selected from the class consisting of an aliphatic radical containing from 1 to 12 carbon atoms and halogen, $m$ is a number from 1 to 3, $n$ is a number from 0 to 3, $x$ is a number from 1 to 3, and $y$ is a number from 0 to 6; oxyalkylation of said polyphenol being effected by reaction with an alkylene oxide containing about 2 to about 4 carbon atoms, in a ratio of at least one mole of alkylene oxide for each hydroxyl group, and one oxyalkylated polyhydroxy compound which is an oxyalkylation product of sucrose of the formula:

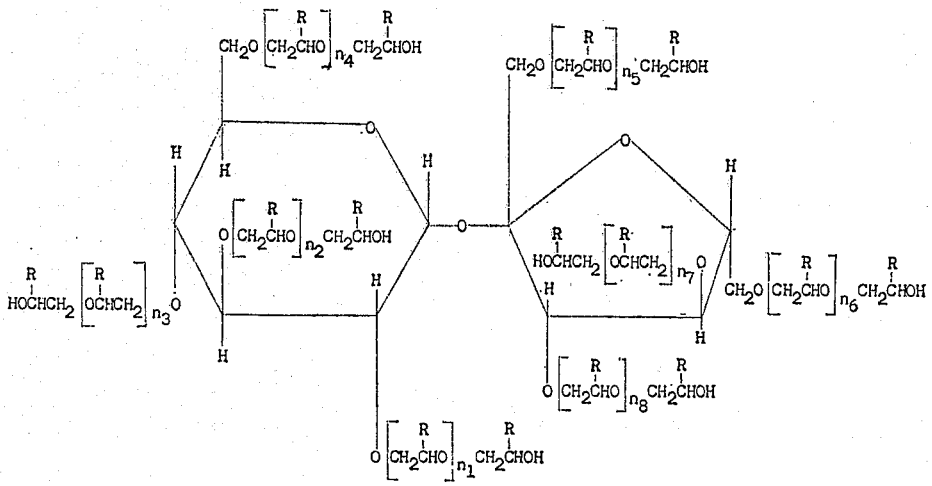

wherein R is selected from the class consisting of hydrogen or methyl, and $n_1$, $n_2$, $n_3$, $n_4$, $n_5$, $n_6$, $n_7$, and $n_8$ are whole numbers from 0 to 8 and their sums being in a range of about 2 to about 18;
(B) a prepolymer which is a reaction product of an excess of an organic polyisocyanate and a polyol as in (A), and
(C) a blowing agent.

8. A foam as in claim 7 where the blowing agent is a chlorofluorocarbon.

9. A foam as in claim 7 where the blowing agent is a mixture of a chlorofluorocarbon and water.

10. A foam as in claim 7 where the polyphenol is selected from the group consisting of a phenol-aldol adduct, a phenol-formaldehyde adduct, a phenol-acrolein adduct, a phenol-furfural adduct, P,P'-isopropylidenediphenol and 4,4'-isopropylidene bis(2,6-dibromophenol).

11. A foam as in claim 10 where the blowing agent is a chlorofluorocarbon.

12. A foam as in claim 10 where the blowing agent is a mixture of chlorofluorocarbon and water.

13. A prepolymer comprising the reaction product of a plurality of oxyalkylated polyhydroxy compounds; one of said polyhydroxy compounds being a polyphenol of the formula:

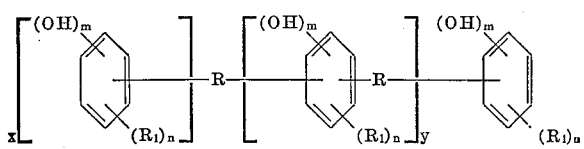

wherein R is an alkylene radical which has a molecular weight up to about 700, $R_1$ is selected from the class consisting of aliphatic radicals containing from 1 to 12 carbon atoms and halogen, $m$ is a number from 1 to 3, $n$ is a number from 0 to 3, $x$ is a number from 1 to 3, and $y$ is a number from 0 to 6; oxyalkylation of said polyphenol being effected by reaction with an alkylene oxide containing about 2 to about 4 carbon atoms, in a ratio of at least one mole of alkylene oxide for each hydroxyl group of said polyphenol; and a second of said oxyalkylated polyhydroxy compounds being an oxyalkylation product of sucrose of the formula:

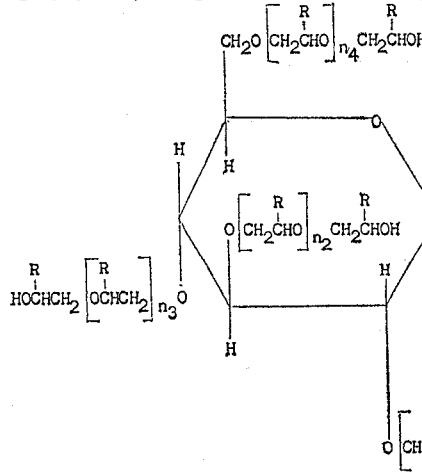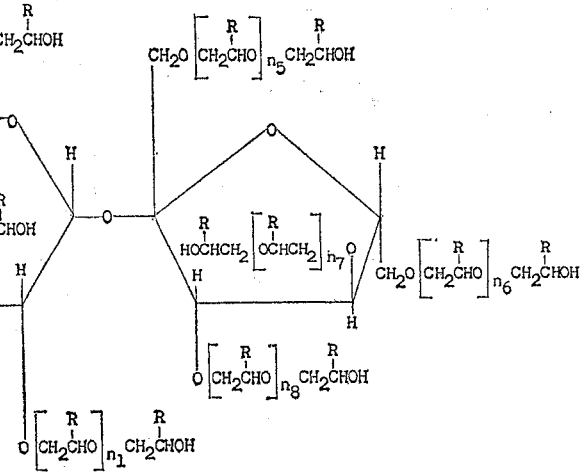

wherein R is selected from the class consisting of hydrogen or methyl, and $n_1$, $n_2$, $n_3$, $n_4$, $n_5$, $n_6$, $n_7$, and $n_8$ are whole numbers from 0 to 8 and their sums being in a range of about 2 to about 18; with an excess of an organic polyisocyanate.

14. A prepolymer as in claim 13 wherein the polyphenol is selected from the group consisting of a phenolaldol adduct, a phenol-formaldehyde adduct, a phenolacrolein adduct, a phenol-furfural adduct, P,P'-isopropylidenediphenol and 4,4'-isopropylidene bis(2,6-dibromophenol).

References Cited by the Examiner
UNITED STATES PATENTS

| | | | |
|---|---|---|---|
| 2,902,478 | 9/1959 | Anderson | 260—209 |
| 3,072,582 | 1/1963 | Frost | 260—2.5 |
| 3,073,788 | 1/1963 | Hostettler et al. | 260—2.5 |
| 3,075,927 | 1/1963 | Lanham | 260—2.5 |
| 3,085,085 | 4/1963 | Wismer et al. | 260—209 |
| 3,153,002 | 10/1964 | Wismer et al. | 260—2.5 |
| 3,164,558 | 1/1965 | Eichhorn | 260—2.5 |

LEON J. BERCOVITZ, *Primary Examiner.*

DONALD E. CZAJA, *Examiner.*

UNITED STATES PATENT OFFICE
CERTIFICATE OF CORRECTION

Patent No. 3,265,641                          August 9, 1966

Marco Wismer et al.

It is hereby certified that error appears in the above numbered patent requiring correction and that the said Letters Patent should read as corrected below.

Column 20, lines 56 to 64, the center portion of the formula should appear as shown below instead of as in the patent:

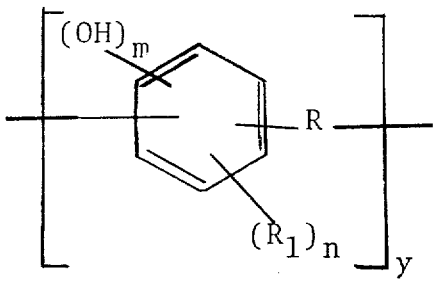

columns 21 and 22, about lines 3 to 25, the left-hand portion of the formula should appear as shown below instead of as in the patent:

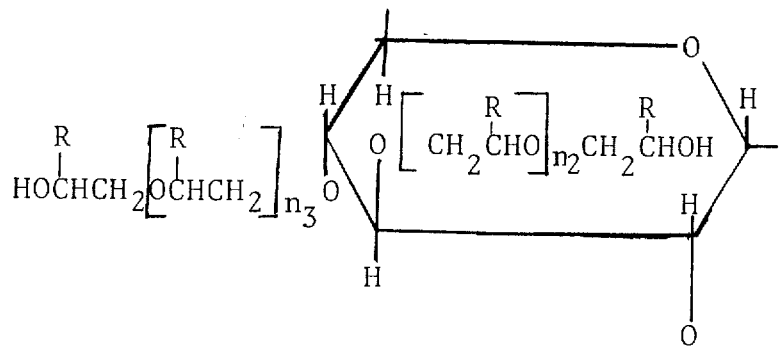

Signed and sealed this 10th day of September 1968.

(SEAL)
Attest:

EDWARD M. FLETCHER, JR.                          EDWARD J. BRENNER
Attesting Officer                                Commissioner of Patents